(12) United States Patent
Schwartz et al.

(10) Patent No.: US 7,648,644 B2
(45) Date of Patent: Jan. 19, 2010

(54) STABLE HIGH-TEMPERATURE BOROHYDRIDE FORMULATION

(75) Inventors: Curtis Schwartz, Ambler, PA (US); John Hiroshi Yamamoto, Andover, MA (US)

(73) Assignee: Rohm and Haas Company, Philadelphia, PA (US)

( * ) Notice: Subject to any disclaimer, the term of this patent is extended or adjusted under 35 U.S.C. 154(b) by 386 days.

(21) Appl. No.: 11/823,555

(22) Filed: Jun. 28, 2007

(65) Prior Publication Data

US 2008/0009575 A1 Jan. 10, 2008

Related U.S. Application Data

(60) Provisional application No. 60/818,609, filed on Jul. 5, 2006.

(51) Int. Cl.
*C01B 3/04* (2006.01)
*C01B 6/11* (2006.01)

(52) U.S. Cl. ............. 252/188.26; 252/181; 252/188.25; 106/287.35

(58) Field of Classification Search ............ 106/287.35; 252/181, 188.25, 188.26
See application file for complete search history.

(56) References Cited

U.S. PATENT DOCUMENTS

| 2,970,114 | A | * | 1/1961 | Bragdon ................. 252/188.26 |
| 3,538,012 | A | * | 11/1970 | Goerrig ................. 252/188.26 |
| 3,933,676 | A | | 1/1976 | Wade |
| 5,169,555 | A | * | 12/1992 | Mikulski et al. ....... 252/188.26 |
| 5,354,478 | A | | 10/1994 | Ulman et al. |
| 6,866,689 | B2 | | 3/2005 | Lumsden et al. |

FOREIGN PATENT DOCUMENTS

EP 0485074 A1 * 5/1992

\* cited by examiner

*Primary Examiner*—David M Brunsman
(74) *Attorney, Agent, or Firm*—Kenneth Crimaldi

(57) ABSTRACT

A stabilized aqueous mixture containing at least one borohydride compound and at least one metal hydroxide compound. The mixture has improved stability with regard to decomposition of borohydride, especially at elevated temperatures.

10 Claims, No Drawings

STABLE HIGH-TEMPERATURE BOROHYDRIDE FORMULATION

This application claims the benefit of priority under 35 U.S.C. §119(e) of U.S. Provisional Patent Application No. 60/818,609 filed on Jul. 5, 2006.

This invention relates to an aqueous sodium borohydride mixture having increased stability, especially at high temperatures.

Aqueous borohydride solutions having relatively good stability are known. For example, solutions containing about 12% sodium borohydride and about 40% sodium hydroxide are sold commercially. In some applications, a stable borohydride-containing solution having less sodium hydroxide is desired, e.g., in hydrogen fuel cells. Such a solution is described in U.S. Pat. No. 6,866,689; it contains about 44% sodium borohydride and about 0.2% sodium hydroxide. However, this solution exhibits relatively high rates of borohydride decomposition at elevated temperatures.

The problem addressed by this invention is to find an aqueous formulation of borohydride that has improved stability at elevated temperatures.

STATEMENT OF INVENTION

The present invention provides an aqueous mixture comprising: (a) from 15% to 65% of at least one borohydride compound; (b) from 1% to 10% of at least one metal hydroxide; and (c) from 0.1% to 20% of at least one absorbent polymer or excipient. The invention is further directed to a method for stabilizing aqueous borohydride mixtures by adding at least one absorbent polymer or excipient.

DETAILED DESCRIPTION

Percentages are weight percentages and temperatures are in ° C., unless specified otherwise. A "borohydride compound" is a compound containing the borohydride anion, $BH_4^-$. An "absorbent polymer" is a polymer capable of absorbing water. Preferably, absorbent polymers are chosen from among water-soluble polymers (polymers having water solubility of at least 1%, alternatively at least 5%), cellulose and its derivatives, and cross-linked polymers. Cross-linked polymers preferably have carboxyl, amide, hydroxy, amino, or ether groups, or a combination thereof, to facilitate dispersion in water. "Excipients" are pharmaceutical excipients as defined, e.g., in *Handbook of Pharmaceutical Excipients*, A. Wade & P. J. Weller (1964). Especially preferred excipients are those used as tablet disintegrants, e.g., polyacrylic acids, angelic acid, calcium alginate, carboxymethylcellulose (e.g., calcium or sodium salt), chitosan, croscarmellose sodium, crospovidone, docusate sodium, guar gum, polacrilin potassium, povidone, sodium alginate, sodium starch glycolate, and starch. In one embodiment of the invention, excipients have a water solubility of at least 0.5%, alternatively at least 1%. In one embodiment of the invention, preferred absorbent polymers include polyacrylic acids, polyacrylamide co polyacrylic acid, copolymers of acrylic acid (e.g., polyacrylic acid co polyethylene oxide), polyvinylpyrrolidone, polyvinylpyridine, polyvinylpyridine N-oxide, polyvinylimidazole, ethoxylated polyethylenimine, cellulose esters (e.g., acetate, butyrate), hydroxyalkyl celluloses, and carboxymethyl cellulose. The aqueous mixture of the present invention may be a solution, slurry, gel, or any other fluid mixture at temperatures of at least 40° C.: Mixtures having higher concentrations of borohydride, e.g., at least 50%, typically are solids or thick slurries at ambient temperature of about 25° C., but become fluid at higher temperatures.

In one embodiment, the amount of borohydride compound(s) is at least 20%, alternatively at least 25%. In one embodiment, the amount of metal hydroxide(s) is no more than 8%, alternatively no more than 6%, alternatively no more than 4%. In one embodiment of the invention, the amount of metal hydroxide is at least 2%, alternatively at least 3%. In one embodiment, the amount of borohydride compound is no more than 55%, alternatively no more than 50%, alternatively no more than 45%, alternatively no more than 40%. Preferably, the borohydride compound is a metal salt which has a metal cation from groups 1, 2, 4, 5, 7, 11, 12 or 13 of the periodic table, or a mixture thereof. In one embodiment, the borohydride compound is an alkali metal borohydride or combination thereof, alternatively it comprises sodium borohydride (SBH) or potassium borohydride or a mixture thereof, alternatively sodium borohydride. Preferably, the metal hydroxide is an alkali metal hydroxide or combination thereof; alternatively sodium, lithium or potassium hydroxide, or a mixture thereof; alternatively sodium hydroxide or potassium hydroxide; alternatively sodium hydroxide. More than one alkali metal borohydride and more than one metal hydroxide may be present.

In one embodiment of the invention, the amount of absorbent polymer(s) and/or excipient(s) is at least 0.2%, alternatively at least 0.4%, alternatively at least 1%, alternatively at least 2%. In one embodiment of the invention, the amount of absorbent polymer(s) and/or excipient(s) is no more than 15%, alternatively no more than 12%, alternatively no more than 10%, alternatively no more than 8%. In one embodiment of the invention, extremely small amounts of absorbent polymer(s) and/or excipient(s) are required; at least 0.1%, but no more than 1%, alternatively no more than 0.5%. For example, partially neutralized polyacrylic acids, or copolymers containing at least 20% acrylic acid monomer units, alternatively at least 30%, alternatively at least 50%, alternatively at least 75%, may require only very small amounts of absorbent polymer(s) and/or excipient(s). The degree of neutralization of the polyacrylic acids added to the borohydride compound(s) is not critical because the aqueous mixture contains additional base, so that the acids typically will be completely neutralized in the aqueous mixture. For polymers used in this invention, a weight average molecular weight of at least 1500 is preferred, alternatively at least 3000, alternatively at least 5000.

In one embodiment of the invention, the aqueous mixture is substantially free of substances that catalyze hydrolysis of borohydride, e.g., salts of transition metals such as Co, Ru, Ni, Fe, Rh, Pd, Os, Ir, Pt, or mixtures thereof, and borides of Co and/or Ni.

The aqueous mixture of this invention also may be used in the fields of synthesis and metal recovery.

EXAMPLES

TABLE 1

Decomposition rate of solutions containing 25% SBH, 3% NaOH with additives at room temperature and 60° C.

| 25% SBH, 3% NaOH with Additive | Wt % of additive | Rate of decomposition At RT, % SBH/day | Rate of decomposition at 60° C. % SBH/day | % decrease in decomposition rate at 60° C. |
|---|---|---|---|---|
| None, 25% NaBH$_4$, 3% NaOH | N/A | −0.12 | −0.958 | N/A |
| Poly acrylic acid partial sodium salt, lightly cross linked (solid) CAS # 76774-25-9 | 0.5 | −0.05 | −0.564 | 41 |
| Poly acrylamide co acrylic acid partial sodium salt (solid) M$_w$ = 15,000,000 | 0.5 | −0.074 | −0.662 | 31 |
| Poly acrylic acid co poly ethylene oxide (solid) CAS # 27599-59-56-0 | 0.5 | −0.012 | −0.614 | 36 |
| Poly vinyl pyrrolidone (solid) M$_w$ = 10,000; CAS # 9003-39-0 | 0.5 | −0.004 | −0.734 | 23 |
| Carboxy methyl cellulose sodium salt (solid) M$_w$ = 70,000; CAS # 9004-39-4 | 0.5 | −0.032 | −0.728 | 24 |

The addition of poly acrylic acid partial cross linked partial sodium salt to higher-concentration sodium borohydride formulations also results in decreasing the hydrolysis rates of the 40 and 50 wt % formulations. An unexpected phenomenon has been observed when these formulations are heated for long periods of time. After an initial induction period, the rate of hydrolysis of the borohydride decreases to nearly zero.

TABLE 2

Decomposition rate ("DR") of solutions containing 40% SBH, 5% NaOH with additives at room temperature and 50° C.

| 40% SBH, 5% NaOH with Additive | Wt % of additive | DR at RT % SBH/day | DR at 50° C. % SBH/Day | % decrease in DR at 50° C. | DR at 50° C. % SBH/Day After induction period |
|---|---|---|---|---|---|
| None, 40% NaBH$_4$, 5% NaOH | N/A | 0.0549 | 0.3604 | N/A | N/A |
| Poly acrylic acid partial sodium salt, lightly cross linked (solid) CAS # 76774-25-9 | 0.5 | 0.0333 | 0.1139 | 68 | 0.0547 |
| Poly acrylic acid partial sodium salt (Liquid) M$_w$ = 30,000; CAS # 9003-04-07 | 4% | 0.0339 | 0.1716 | 52 | 0.0084 |

TABLE 3

Decomposition rate of solutions containing 50% SBH, 5% NaOH with additives at room temperature and 58° C.

| 50% SBH, 5% NaOH with Additive | Wt % of additive | DR at RT % SBH/day | DR at 58° C. % SBH/day | % decrease in DR | DR at 58° C. % SBH/day after induction period |
|---|---|---|---|---|---|
| None, 50% NaBH$_4$, 5% NaOH | N/A | 0.0031 | 0.35 | N/A | N/A |
| Poly acrylic acid partial sodium salt, lightly cross linked (solid) CAS # 76774-25-9 | 0.5% | — | 0.03121 | 91 | 0.01165 |
| Poly acrylic acid partial sodium salt (Liquid) M$_w$ = 30,000; CAS # 9003-04-07 | 4% | — | 0.01715 | 95 | 0.01388 |

TABLE 4

Decomposition rate of solutions containing 25% SBH, 5% NaOH with different wt % of poly acrylic acid), partial sodium salt solid at 22° C.

| Temp ° C. | Wt % additive | Rate of decomposition % SBH/Day | % Difference |
|---|---|---|---|
| 22 | 0 | 0.026 | N/A |
| 22 | 0.5 | 0.011 | 57.7 |
| 22 | 1 | 0.0485 | |
| 22 | 1.5 | 0.0473 | |
| 22 | 2 | 0.0473 | |
| 22 | 4 | 0.025 | 3.8 |

TABLE 5

Decomposition rate of solutions containing 25% SBH, 5% NaOH with different wt % of poly acrylic acid), partial sodium salt solid at 60° C.

| Temp ° C. | Wt % additive | Rate of decomposition % SBH/Day | % Difference |
|---|---|---|---|
| 60 | 0 | 0.4334 | N/A |
| 60 | 0.5 | 0.3764 | 13.2 |
| 60 | 1 | 0.409 | 5.6 |
| 60 | 1.5 | 0.424 | 2.1 |
| 60 | 2 | 0.4114 | 5.1 |
| 60 | 4 | 0.4201 | 3.1 |

TABLE 6

Decomposition rate of solutions containing 25% SBH, 5% NaOH with different wt % of poly (acrylic acid sodium salt 30% in water $M_w$ = 15,000 at 22° C. (wt. % additive in this table, and following tables based on total polymer/water formulation)

| Temp ° C. | Wt % additive | Rate of decomposition, % SBH/Day | Rate of decomposition of standard, % SBH/Day | % Difference |
|---|---|---|---|---|
| 22 | 0 | | 0.1161 | |
| 22 | 10 | 0.1161 | 0.0114 | |
| 22 | 5 | 0.0019 | 0.1029 | 98.1 |
| 22 | 1 | 0.046 | 0.0421 | |

TABLE 7

Decomposition rate of solutions containing 25% SBH, 5% NaOH with different wt % of polyacrylic acid sodium salt 30% in water $M_w$ = 15,000 at 60° C.

| Temp ° C. | Wt % additive | Rate of decomposition, % SBH/Day | Rate of decomposition of standard, % SBH/Day | % Difference |
|---|---|---|---|---|
| 60 | 0 | | | |
| 60 | 10 | 0.3982 | 0.4993 | 20.2 |
| 60 | 5 | 0.4301 | 0.4964 | 13.3 |
| 60 | 1 | 0.4236 | 0.4399 | 3.7 |

TABLE 8

Decomposition rate of solutions containing 25% SBH, 5% NaOH with 15 wt % of polyethyleneimine 80% ethoxylated at 22° C.

| Temp ° C. | | Wt % additive | Rate of decomposition % SBH/Day | % Difference |
|---|---|---|---|---|
| | Standard | 0 | 0.0585 | N/A |
| 22 | Polyethylenimine 80%, ethoxylated 37% in water $M_w$ = 50,000; CAS # 26558-46-8 | 15 | 0.0116 | 80.1 |
| 22 | Polyethylenimine 80% ethoxylated 35 to 40% in water $M_w$ = 70,000; CAS # 26558-46-8 | 15 | 0.0321 | 45.1 |

TABLE 9

Decomposition rate of solutions containing 25% SBH, 5% NaOH with 15 wt % of polyethyleneimine 80% ethoxylated at 60° C.

| Temp ° C. | | Wt % additive | Rate of decomposition % SBH/Day | % Difference |
|---|---|---|---|---|
| | Standard | 0 | 0.5782 | N/A |
| 60 | Polyethyleneimine 80% ethoxylated, 37% in water $M_w$ = 50,000; CAS # 26558-46-8 | 15 | 0.5096 | 11.8 |
| 60 | Polyethylenimine 80% ethoxylated, 35 to 40% in water $M_w$ = 70,000; CAS # 26558-46-8 | 15 | 0.5052 | 12.6 |

TABLE 10

Decomposition rate of solutions containing 25% SBH, 5% NaOH with 15 wt % different MW polyacrylic acid sodium salts at 22° C.

| Temp ° C. | | Wt % additive | DR % SBH/ Day | % Difference |
|---|---|---|---|---|
| | Standard | 0 | 0.0585 | N/A |
| 22 | Poly (acrylic acid sodium salt 45% in water $M_w$ = 1,200; CAS # 9003-04-7 | 15 | 0.06493 | Higher by 10 |
| 22 | Poly (acrylic acid sodium salt 45% in water $M_w$ = 8,000; CAS # 9003-04-7 | 15 | 0.0257 | 56.0 |
| 22 | Poly (acrylic acid sodium salt 40% in water $M_w$ = 30,000; CAS # 9003-04-7 | 15 | 0.0091 | 84.4 |

TABLE 11

Decomposition rate of solutions containing 25% SBH, 5% NaOH with 15 wt % of different MW poly acrylic acid sodium salts at 60° C.

| Temp ° C. | | Wt % additive | DR %SBH/ Day | % Difference |
|---|---|---|---|---|
| | Standard | 0 | 0.5782 | N/A |
| 60 | Poly (acrylic acid sodium salt 45% in water $M_w$ = 1,200; CAS # 9003-04-7 | 15 | 0.3812 | 34.0 |
| 60 | Poly (acrylic acid sodium salt 45% in water $M_w$ = 8,000; CAS # 9003-04-7 | 15 | 0.3607 | 37.6 |
| 60 | Poly (acrylic acid sodium salt 40% in water $M_w$ = 30,000; CAS # 9003-04-7 | 15 | 0.3736 | 35.38 |

The invention claimed is:

1. An aqueous mixture comprising:
   (a) from 15 wt. % to 65 wt. % of at least one borohydride compound;
   (b) from 1 wt. % to 10 wt. % of at least one metal hydroxide; and
   (c) from 0.1 wt. % to 20 wt. % of at least one absorbent polymer or excipient.

2. The aqueous mixture of claim 1 in which said at least one borohydride compound is sodium borohydride, potassium borohydride or a combination thereof, and said at least one metal hydroxide is sodium, lithium or potassium hydroxide, or a combination thereof.

3. The aqueous mixture of claim 2 in which said at least one absorbent polymer or excipient is selected from among water-soluble polymers, cellulose and its derivatives and cross-linked polymers.

4. The aqueous mixture of claim 3 in which the borohydride compound is sodium borohydride and the metal hydroxide is sodium hydroxide.

5. The aqueous mixture of claim 4 having from 2 wt. % to 8 wt. % sodium hydroxide and from 20 wt. % to 50 wt. % sodium borohydride.

6. The aqueous mixture of claim 5 in which said at least one absorbent polymer or excipient is polyacrylic acid or a copolymer of acrylic acid having at least 50% acrylic acid monomer units.

7. The aqueous mixture of claim 6 having from 0.1 wt. % to 1 wt. % polyacrylic acid or acrylic acid copolymer, and in which weight average molecular weight of the polyacrylic acid or copolymer of acrylic acid is at least 1500.

8. A method for stabilizing an aqueous borohydride mixture containing from 15 wt. % to 65 wt. % of at least one borohydride compound and from 1% to 10 wt. % of at least one metal hydroxide; said method comprising adding from 0.1 wt. % to 20 wt. % of at least one absorbent polymer or excipient.

9. The method of claim 8 said at least one metal hydroxide is sodium hydroxide and said at least one borohydride compound is sodium borohydride.

10. The method of claim 9 in which the aqueous borohydride mixture has from 2 wt. % to 8 wt. % sodium hydroxide and from 20 wt. % to 50 wt. % sodium borohydride.

* * * * *